US007581827B2

(12) United States Patent
Platt et al.

(10) Patent No.: US 7,581,827 B2
(45) Date of Patent: Sep. 1, 2009

(54) SYSTEM AND METHOD FOR MELTING SOLID INK STICKS IN A PHASE CHANGE INK PRINTER

(75) Inventors: David Paul Platt, Newberg, OR (US); Brent Rodney Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 172 days.

(21) Appl. No.: 11/411,678

(22) Filed: Apr. 26, 2006

(65) Prior Publication Data

US 2007/0252876 A1 Nov. 1, 2007

(51) Int. Cl.
*B41J 2/175* (2006.01)
*G01D 11/00* (2006.01)

(52) U.S. Cl. .............................. 347/88; 347/99; 347/85

(58) Field of Classification Search .................. 347/88, 347/99, 84, 85, 95
See application file for complete search history.

(56) References Cited

U.S. PATENT DOCUMENTS

| | | | | | |
|---|---|---|---|---|---|
| 2,496,471 | A | * | 2/1950 | Hornbostel | 277/368 |
| 2,508,509 | A | * | 5/1950 | Germer et al. | 118/715 |
| 2,770,669 | A | * | 11/1956 | Smith | 174/152 R |
| 2,921,805 | A | * | 1/1960 | Shevchenko | 277/365 |
| 3,346,265 | A | * | 10/1967 | Rhoads et al. | 277/554 |
| 4,739,339 | A | * | 4/1988 | DeYoung et al. | 347/86 |
| 5,004,110 | A | * | 4/1991 | Osip et al. | 215/232 |
| 5,276,468 | A | | 1/1994 | Deur et al. | |
| 5,277,721 | A | * | 1/1994 | Ooms | 156/64 |
| 5,489,925 | A | * | 2/1996 | Brooks et al. | 347/6 |
| 5,699,095 | A | * | 12/1997 | Mitsuzawa et al. | 347/92 |
| 5,784,089 | A | | 7/1998 | Crawford | |
| 5,920,332 | A | | 7/1999 | Brooks | |
| 6,024,433 | A | * | 2/2000 | Tsurui et al. | 347/26 |
| 6,089,686 | A | * | 7/2000 | Thornton et al. | 347/7 |
| 6,116,726 | A | * | 9/2000 | Driggers | 347/87 |
| 6,422,694 | B1 | * | 7/2002 | Hollands | 347/88 |
| 6,530,655 | B2 | | 3/2003 | Jones et al. | |
| 6,601,950 | B2 | | 8/2003 | Hollands et al. | |
| 6,880,911 | B2 | | 4/2005 | Suzuki et al. | |
| 6,905,201 | B2 | | 6/2005 | Leighton | |

* cited by examiner

*Primary Examiner*—Stephen D Meier
*Assistant Examiner*—Leonard S Liang
(74) *Attorney, Agent, or Firm*—Maginot, Moore & Beck LLP

(57) ABSTRACT

A solid ink stick melting apparatus is incorporated in a phase change printer to provide melted ink under pressure to a print head. The solid ink stick melting apparatus includes an ink stick melt chamber having an enclosure with at least one heated wall, an inlet for receiving an ink stick, and an outlet for melted ink flow from the enclosure, and a seal mounted proximate the inlet to engage an ink stick passing through the seal so that the seal and the ink stick form a barrier and retain melted ink within the enclosure.

23 Claims, 7 Drawing Sheets

SYSTEM AND METHOD FOR MELTING SOLID INK STICKS IN A PHASE CHANGE INK PRINTER

TECHNICAL FIELD

This disclosure relates generally to machines that use phase change materials, and more particularly, to machines that melt solid phase change ink for imaging.

BACKGROUND

Solid ink or phase change ink printers conventionally use ink in a solid form, either as pellets or as ink sticks of colored cyan, yellow, magenta and black ink, that are inserted into feed channels through openings to the channels. Each of the openings may be constructed to accept sticks of only one particular configuration. Constructing the feed channel openings in this manner helps reduce the risk of an ink stick having a particular characteristic being inserted into the wrong channel. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

After the ink sticks are fed into their corresponding feed channels, they are urged by gravity or a mechanical actuator to a heater assembly of the printer. The heater assembly includes a heater that converts electrical energy into heat and a melt plate. The melt plate is typically formed from aluminum or other lightweight material in the shape of a plate or an open sided funnel. The heater is proximate to the melt plate to heat the melt plate to a temperature that melts an ink stick coming into contact with the melt plate. The melt plate may be tilted with respect to the solid ink channel so that as the solid ink impinging on the melt plate changes phase, it is directed to drip into the reservoir for that color. The ink stored in the reservoir continues to be heated while awaiting subsequent use.

Each reservoir of colored, liquid ink may be coupled to a print head through at least one conduit. The liquid ink is pulled from the reservoir as the print head demands ink for jetting onto a receiving medium or image drum. The print head elements, which are typically piezoelectric devices, receive the liquid ink and expel the ink onto an imaging surface as a controller selectively activates the elements with a driving voltage. Specifically, the liquid ink flows from the reservoirs through manifolds to be ejected from microscopic orifices by piezoelectric elements in the print head.

As throughput rates for liquid ink print heads increase, so does the need for delivering adequate amounts of liquid ink to the print head. One problem arising from higher throughput rates is increased sensitivity to resistance and pressures in the print head flow path. Restricted ink flow can limit or decrease imaging speed. In systems having filtration systems for filtering the liquid ink between the reservoir and a print head element, the flow may also change over time and become insufficient to draw liquid ink to the print head in sufficient amounts to provide the desired print quality.

One way of addressing the issue of flow resistance is to increase the filter area. The increased filter area decreases the pressure drop required to migrate a volume of ink through the filter. Increasing the filter area, however, also increases the cost of the printer as filtration material is often expensive. Moreover, the space for a larger filter may not be available as space in the vicinity of a print head of in a phase change printer is not always readily available.

Another way of overcoming flow resistance as well as increased volume demand with fast imaging is to pressurize the liquid ink to force the ink through a restrictive flow path. The pressure needs to be introduced after the ink has left the melt plate as melt plates do little to pressurize the fluid. The approach of introducing pressure, however, increases the complexity of the printing system, adds a pressure source and related components to the printer, and introduces another maintenance issue for the operational life of the printer.

Melt plates have been formed as tapered chambers and ink sticks are fed into a wide inlet of the tapered chamber. The walls of the tapered chamber are heated to a temperature that melts the solid ink sticks. The increased surface area of the chamber helps reduce the time required for melting an ink stick. The faster melt rate with the increased melt surface allows faster imaging.

One limitation of the tapered melt chambers is the additional opportunity for flow away from the chamber at points other than the intended exit point near the smaller portion of the tapered geometry. Consequently, the tapered chamber must be oriented to ensure gravity influences flow to the intended exit. As noted previously, space constraints may be rather restrictive in some phase change ink printers, which makes it difficult or impossible to configure the ink delivery system to rely on gravity flow control. Also, space above the print head may not be available for a melt chamber having an adequate length to width ratio to achieve the desired melt surface area.

SUMMARY OF THE INVENTION

An improved solid ink stick heating chamber provides decreased melting time and increased melted ink exit flow rates. The heating chamber comprises an ink stick melt chamber having an enclosure with at least one heated wall, an inlet for receiving an ink stick, and an outlet for melted ink flow from the enclosure, and a seal mounted proximate the inlet to engage an ink stick passing through the seal so that the seal and the ink stick form a barrier and retain melted ink within the enclosure. The seal stops the melted ink within the chamber from exiting the enclosure at the inlet. As additional ink sticks are driven through the seal, the pressure within the enclosure increases. The increased pressure enables the chamber to deliver liquid ink at adequate flow rates to the print head.

An improved method for supplying ink to a print head in a phase change printer includes moving ink sticks to an inlet of an ink stick melt chamber having an enclosure with at least one opening, urging ink sticks through a seal mounted proximate the inlet, heating the enclosure to melt ink sticks within the enclosure of the ink stick melt chamber, and blocking leakage of melted ink from the inlet of the ink stick melt chamber with the seal so the melted ink exits the ink stick melt chamber with sufficient pressure to pass through a filter before entering a print head of the printer.

BRIEF DESCRIPTION OF THE DRAWINGS

The foregoing aspects and other features of an ink printer incorporating a solid ink stick melting chamber are explained in the following description, taken in connection with the accompanying drawings, wherein.

DETAILED DESCRIPTION

Figure 1:
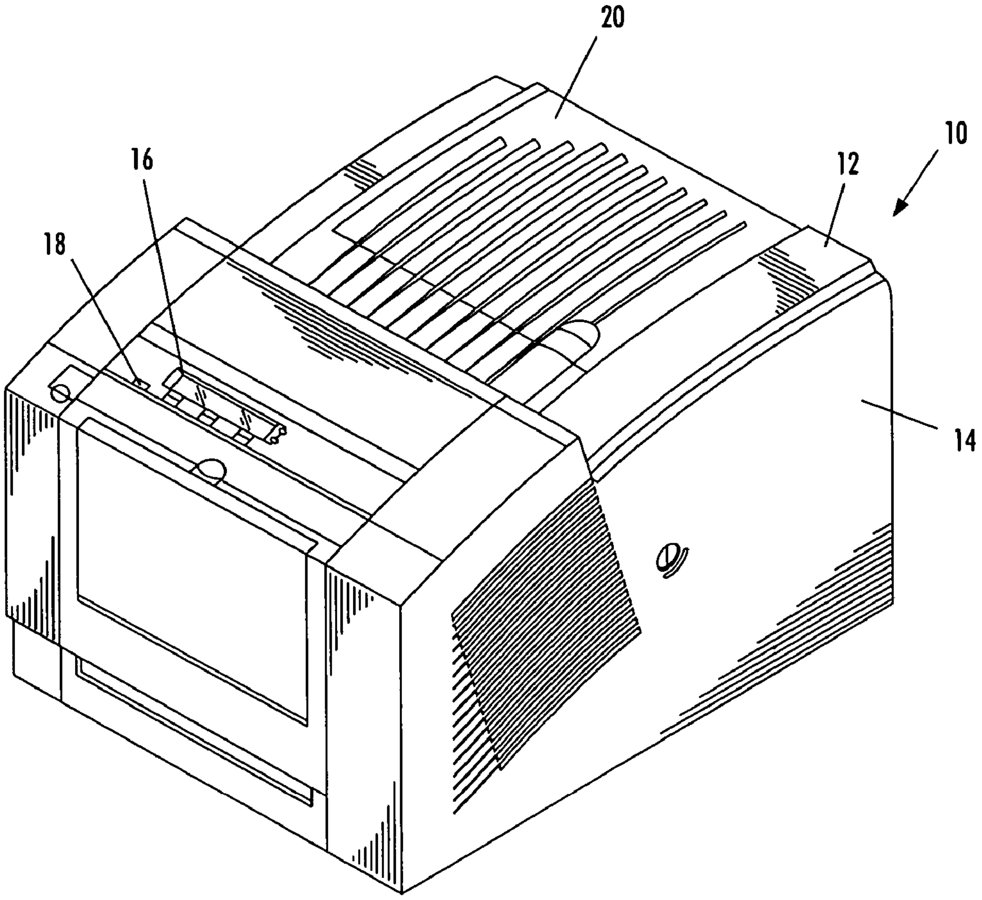
FIG. 1 is a perspective view of a phase change printer with the printer top cover closed.

Referring to FIG. 1, there is shown a perspective view of an ink printer 10 that incorporates a solid ink stick melting chamber that melts solid ink sticks and delivers the melted ink to a print head with sufficient pressure to overcome the fluid resistance of a filter. The reader should understand that the embodiment discussed herein may be implemented in many alternate forms and variations. In addition, any suitable size, shape or type of elements or materials may be used.

FIG. 1 shows an ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (FIG. 3) is contained inside the housing. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

Figure 2:
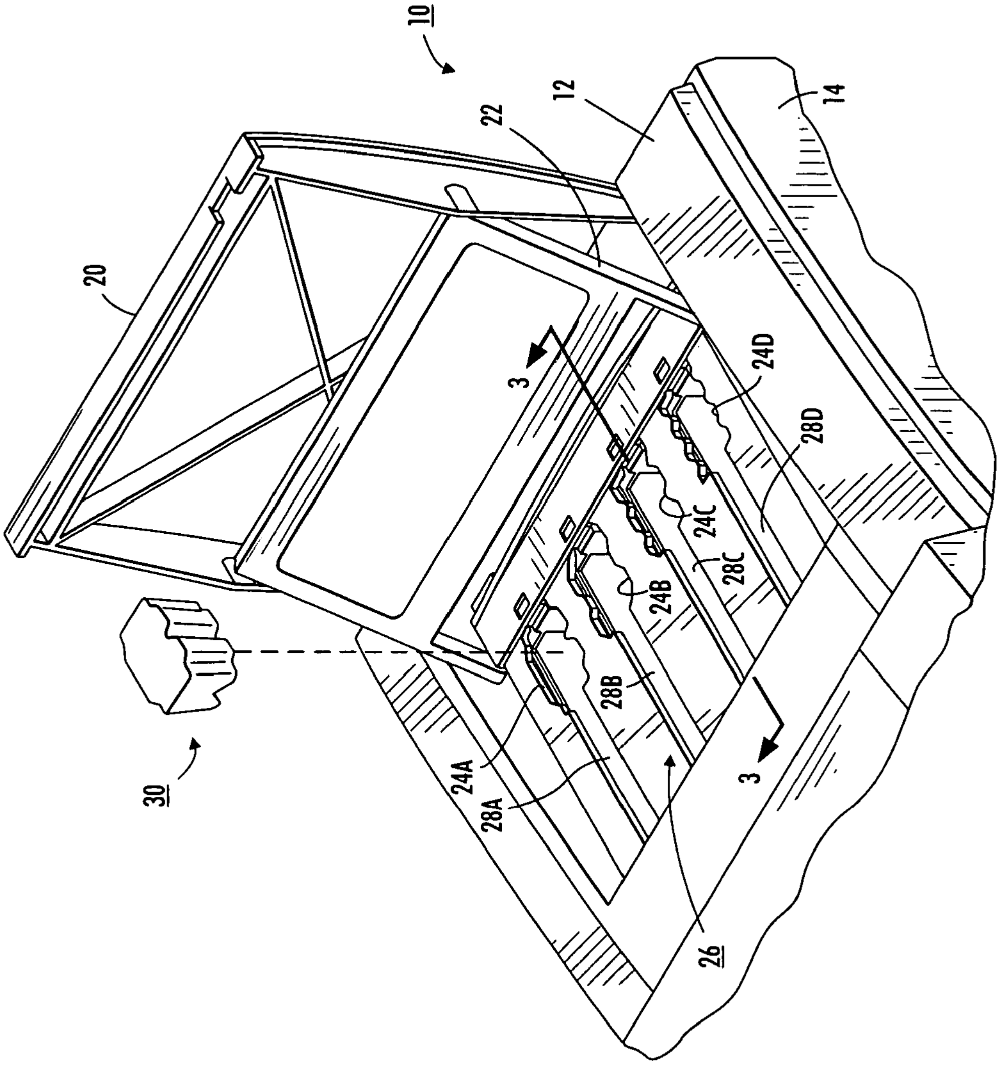
FIG. 2 is an enlarged partial top perspective view of the phase change printer with the ink access cover open, showing a solid ink stick in position to be loaded into a feed channel.

In the particular printer shown in FIG. 2, the ink access cover 20 is attached to an ink load linkage element 22 so that when the printer ink access cover 20 is raised, the ink load linkage 22 slides and pivots to an ink load position. The ink access cover and the ink load linkage element may operate as described in U.S. Pat. No. 5,861,903 for an Ink Feed System, issued Jan. 19, 1999 to Crawford et al. As seen in FIG. 2, opening the ink access cover reveals a key plate 26 having keyed openings 24A-D. Each keyed opening 24A, 24B, 24C, 24D provides access to an insertion end of one of several individual feed channels 28A, 28B, 28C, 28D of the solid ink feed system.

A color printer typically uses four colors of ink (yellow, cyan, magenta, and black). Ink sticks 30 of each color are delivered through one of the feed channels 28A-D having the appropriately keyed opening 24A-D that corresponds to the shape of the colored ink stick. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 3:
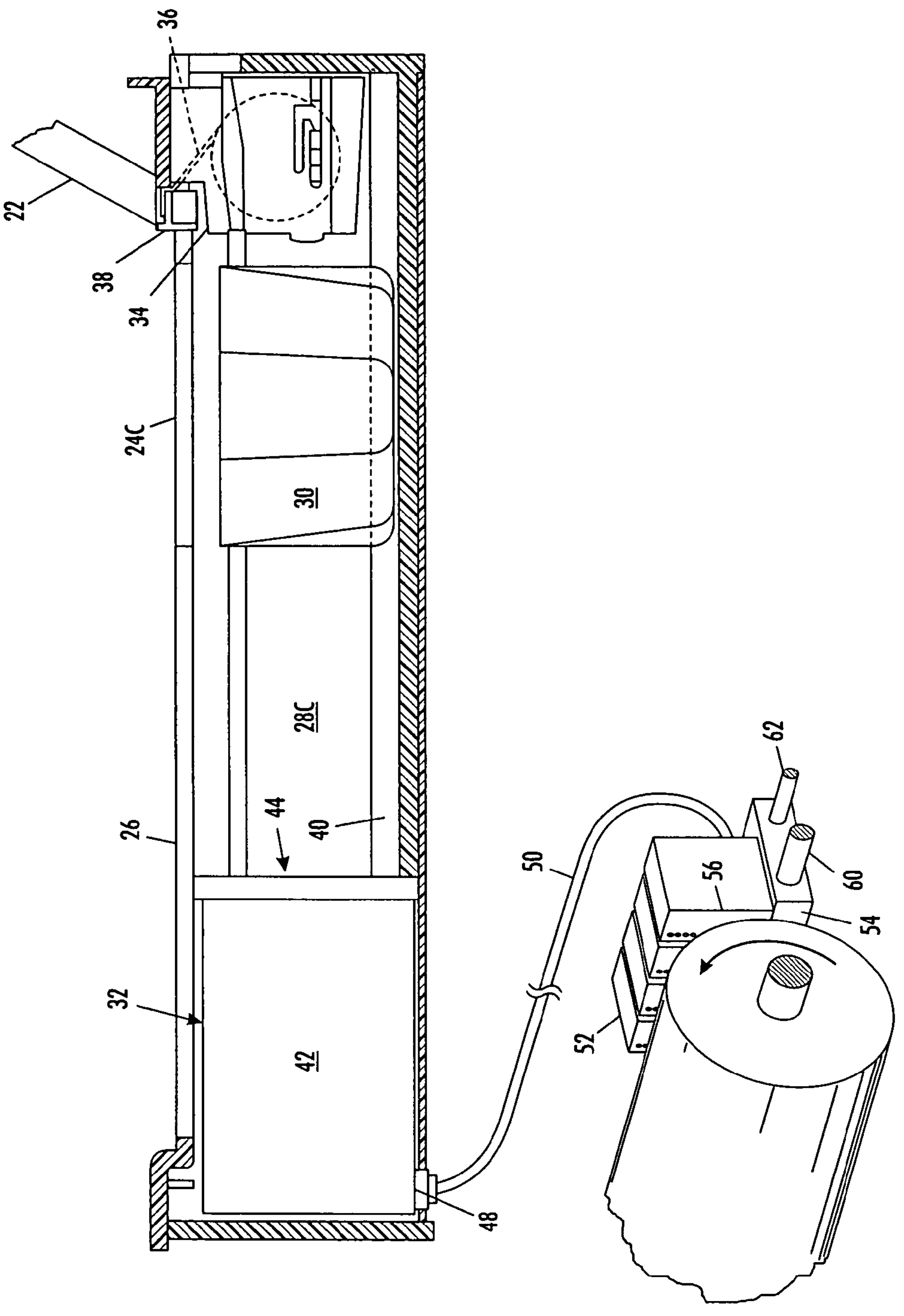
FIG. 3 is a side sectional view of a feed channel of a solid ink feed system taken along line 3-3 of FIG. 2 that shows the solid ink stick melting chamber area and a depiction of its connection to a print head.

As shown in FIG. 3, a feed channel includes a push block 34 driven by a driving force or element, such as a constant force spring 36, to push the individual ink sticks along the length of the longitudinal feed channel toward a melting chamber 32 located at the melt end of each feed channel. The tension of the constant force spring 36 drives the push block toward the melt end of the feed channel. As described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26. As described in more detail below, the melting chamber 32 includes an enclosure 42 having an inlet 44 to which a seal 46 has been mounted. Melted ink exits the chamber 32 through an outlet 48 and flows through a conduit 50 to a reservoir 54 in the print head 52. The print head 52 includes apertures 56 through which the piezoelectric elements eject ink onto an intermediate imaging member 58. The print head 52 may be moved horizontally across the face of the imaging member 58 along rails 60 and 62.

Figure 4:
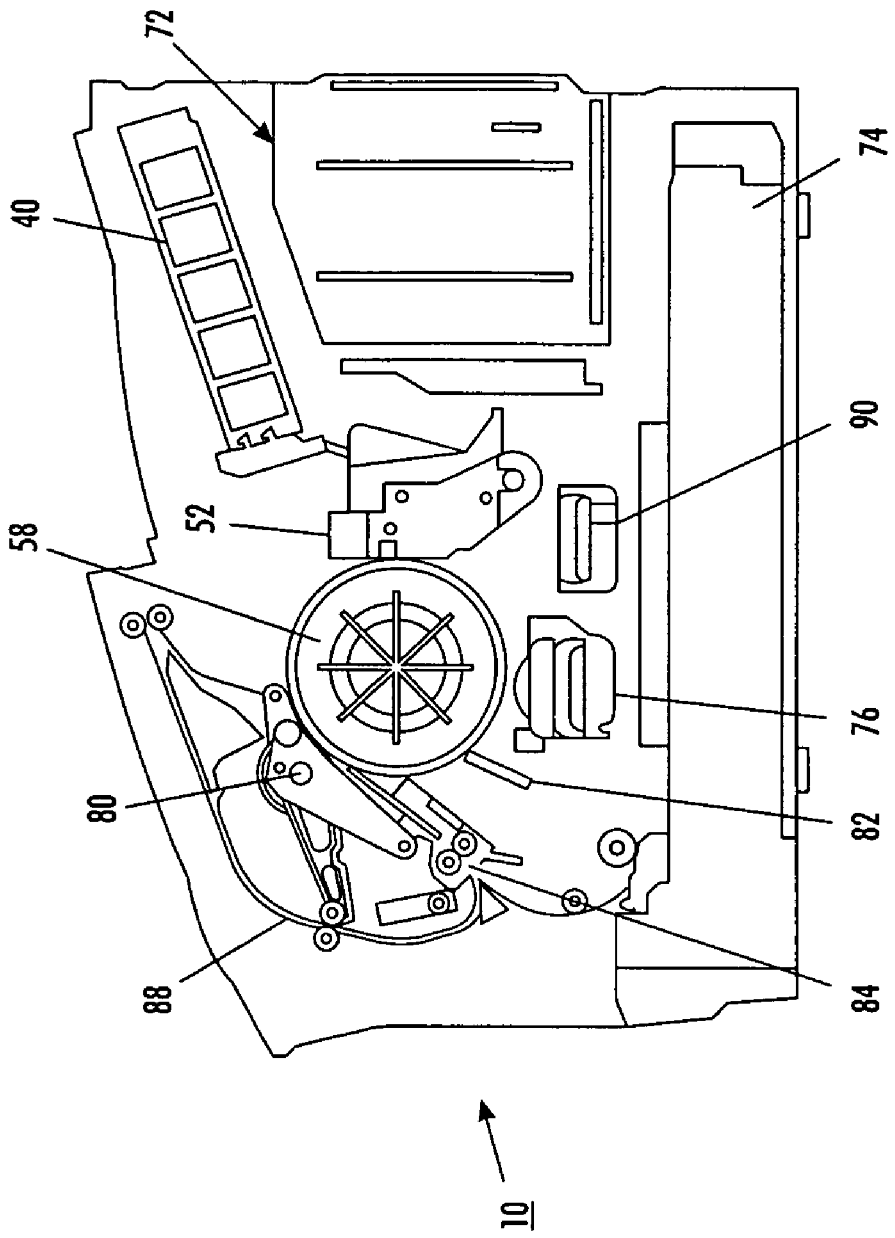
FIG. 4 is a side view of the ink printer shown in FIG. 2 depicting the major subsystems of the ink printer.

As shown in FIG. 4, the ink printer 10 may include an ink loading subsystem 70, an electronics module 72, a paper/media tray 74, a print head 52, an intermediate imaging member 58, a drum maintenance subsystem 76, a transfer subsystem 80, a wiper subassembly 82, a paper/media preheater 84, a duplex print path 88, and an ink waste tray 90. In brief, solid ink sticks 30 are loaded into ink loader feed path 40 through which they travel to a solid ink stick melting chamber 32. At the melting chamber, the ink stick is melted and the liquid ink is diverted to a reservoir for storage before being delivered to print elements in the print head 52. The ink is ejected by piezoelectric elements through apertures to form an image on the intermediate imaging member 58 as the member rotates. An intermediate imaging member heater is controlled by a controller in the electronics module 72 to maintain the imaging member within an optimal temperature range for generating an ink image and transferring it to a sheet of recording media. A sheet of recording media is removed from the paper/media tray 74 and directed into the paper pre-heater 84 so the sheet of recording media is heated to a more optimal temperature for receiving the ink image. Recording media movement between the transfer roller in the transfer subsystem 80 and the intermediate image member 58 is coordinated for the phasing and transfer of the image.

Figure 5:
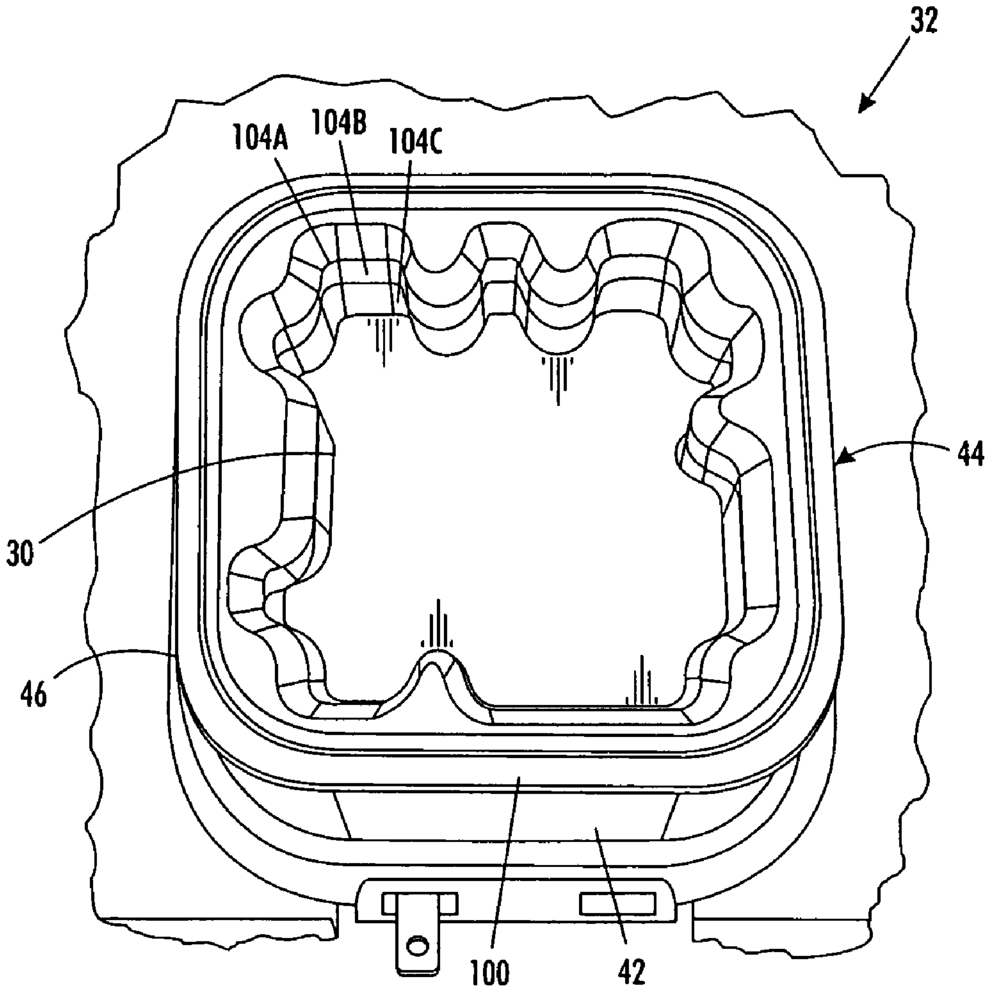
FIG. 5 is a top perspective view of an inlet of the melting chamber shown in FIG. 3 with an ink stick progressing through the seal area within the inlet.

One embodiment of a melting chamber 32 is shown in FIG. 5. A seal 46 is mounted in the inlet 44. The seal may be frictionally fitted, adhesively bonded, or otherwise attached to the lip 100 of the inlet 44. This fitting reduces the likelihood that melted ink is able to get between the seal and the inlet to leak from the chamber. The seal is nestled within the inlet and extends into the enclosure 42. Consequently, the seal 46 is exposed to the temperatures to which the enclosure walls are heated for melting the solid ink sticks. Therefore, the seal 46 should be high temperature tolerant. Elastomeric materials, such as silicone, are used in various embodiments to meet this requirement. Use of these materials for the seal 46, not only enable the seal to withstand the melting temperatures, but also enable the seal to be flexible and to conform more closely to the perimeter shape of the ink sticks fed to the chamber, especially irregularly shaped sticks. To reduce the likelihood that molten ink backs up onto an ink stick and melts the stick, the seal may be designed so that a portion of the seal extends beyond the heated walls of the enclosure to a distance where melted ink is unlikely to reach the ink stick before it solidifies.

Although a single seal 46 may be used to conform to the ink stick passing through the inlet 44, a plurality of seal structures may be used to improve the sealing properties. As shown in FIG. 5, seal lips 104A, 104B, and 104C comprise the seal 46. Each of these lips is configured in the shape of an ink stick to be melted by the chamber 32. The seal 46 and its lips 104A, 104B, and 104C may be formed with the lips slanted inwardly towards the enclosure 42. This slant helps direct the ink sticks into the enclosure while also more effectively resisting the back flow of melted ink. An ink stick 30 is shown in the inlet 44 that has a series of protuberances and recesses as known in the art. The lips are also formed to comport with these protuberances and recesses. Thus, as an ink stick passes through the seal 46, it essentially mates with the lips of the seal 46. This mating provides a series of seals to the melted ink within the chamber 32 and helps prevent the liquid ink from leaking from the enclosure through the inlet. Where imperfections interfere with a snug fit between an ink stick exterior and a seal ridge, the melted ink may pass beyond the seal lip. Voids around the perimeter of the ink sticks at the interface between sticks can also allow some ink leakage past a seal. The small leakage volume cools and solidifies fairly quickly so leakage is minimized, particularly when flow is limited by using more than one seal. Compliant seals allow the solidified ink attached to the periphery at the leak points to pass beyond the seal as the ink feeds toward the melt enclosure. The outlet in the seal ahead of the first lip may be formed so that the enclosure outlet is through the seal. Having multiple lips help ensure that any back flow escaping a lip closer to the enclosure is eventually slowed enough to solidify and block any further back flow out of the chamber. As long as a solid ink stick remains at least partially within the feed channel and engaged with the seal 46, a barrier is presented to the liquid ink. This barrier enables pressure to develop within the enclosure that is sufficient to push the molten ink out of the outlet. In one embodiment, a series of five lips are used to provide a seal for a melting chamber.

To further improve the integrity of the mating between the seal 46 and an ink stick 30, the seal 46 may be backed up by material between the seal 46 and the enclosure wall in the vicinity of the inlet 44. Such materials may include, for example, low density foam or added seal material in one or more areas. These materials may be fitted any time during assembly, bonded to the seal before the seal is mounted to the inlet 44, or bonded to the inlet before the seal is mounted to the inlet. These materials fill the void between the seal and enclosure wall near the inlet to help preserve the shape of the seal that conforms to the ink stick outer surface. In another embodiment, an air bladder may be provided between the enclosure wall and the seal to reinforce the seal.

The seal 46, as noted above, is formed to be compatible with an ink stick shape as it moves in the feed direction. The mating of the seal to the ink stick generates friction as the ink stick progresses through the seal. In one embodiment, this friction is designed to be not more than 0.5 kg to be compatible with the pushing force exerted by the push blocks of known phase change ink printers. The number of seal lips and the exact geometry of the lips depends upon a number of factors, such as, ink stick cross-sectional shape, the hardness or durometer of the seal material, the pressure required in the melted ink conduit to supply adequate ink to the print head, orientation of the melting chamber, expected condition of the ink sticks, and the tolerances for the size and form of the ink sticks, for example. In one embodiment, the lips of the seal are 3.5 mm apart and are 0.8 mm in height and thickness with a 45° angle with the feed direction. The seal wall in this embodiment is 0.6 mm thick and spaced 0.4 mm inside the nominal ink stick outer surface. This geometry provides 0.4 mm nominal displacement of the seals. The lip closest to the enclosure interior is approximately 4.0 mm from the inlet lead-in surface of the enclosure.

Figure 6:
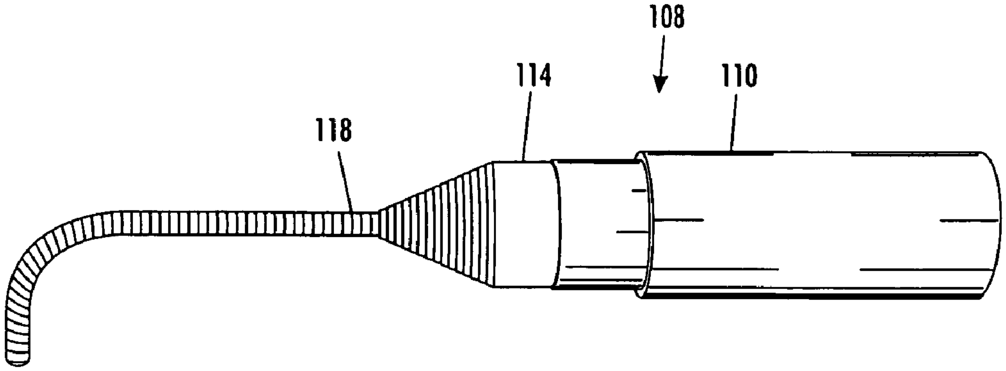
FIG. 6 is a side view of another embodiment of the melting chamber having a cylindrical enclosure and a cylindrical seal at the inlet.

The geometry of the enclosure 42 may be quite varied. The enclosure may have multiple walls joined in a rectilinear or polygonal shape. The walls of the enclosure may be coupled to an electrical power source to heat the walls to an appropriate temperature for melting the ink sticks supplied by the feed channel. The enclosure may also be a single wall formed in a cylindrical, elliptical, or other curved shape. In one embodiment, the enclosure approximates the perimeter shape of an ink stick configured for transport through the feed channel leading to the ink stick melt chamber. An exemplary cylindrical melting chamber 108 is shown in FIG. 6. The inlet has a seal 110 having an outer cylindrical shape for mating with the cylindrical wall of the enclosure 114. The inner surface of the inlet may still be formed to conform to the shape of a known ink stick or it may be configured to accommodate cylindrical or spherical ink sticks. The outlet 118 is shown as being located at the end of a tapered section of the enclosure 114, although it may be placed at any position on the enclosure 114 where melted ink is trapped between outlet and the barrier formed by the seal at the inlet and the ink stick passing through the seal. For example, the enclosure 114 may be formed as a wedge without a tapering section and the outlet may be formed, for example, in the bottom of the wedge so the outlet is essentially at a right angle to the feed direction of the ink sticks to the chamber. The enclosing structure of the chamber provides greater surface area for heating the ink sticks entering the chamber than flat melt plates. Consequently, ink sticks may be more quickly melted.

One constraint to enclosure shape is the balance of surface area, angles, and temperatures of the enclosure surfaces into which the ink sticks are pushed. This constraint arises from the exaggeration of off side forces by steering or angling from the intended straight line path for the ink sticks. Soft, low force seals may be overcome and distended if an ink stick strays too much from the intended feed path. Accordingly, an enclosure is configured to maintain the ink stick in a straight line path.

The wall or walls of the enclosure may be heated with any appropriate heating element. These heating elements include, but are not limited to, exterior bonded heaters, spray/dip surface applied heating materials, and internal heating elements. Internal heating elements include, for example, overmolded resistive heaters, wire wrap or strip heaters, and the like. The enclosure walls may be made from high temperature plastic, drawn and formed steel, aluminum, or other suitable metals. The walls may also be comprised of multiple pieces coupled together and may be sealed against leakage with a thin membrane of silicone or similar material.

Figure 7:
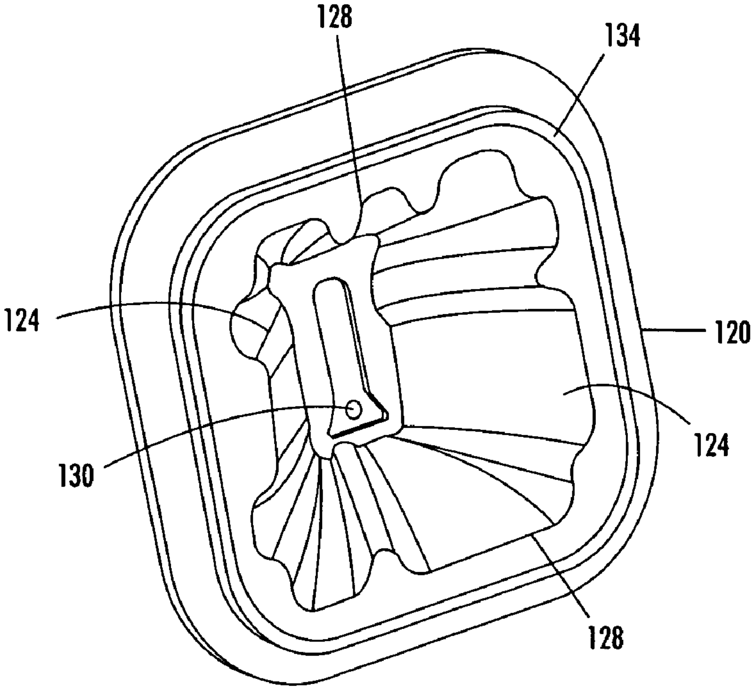
FIG. 7 is a perspective view of another embodiment of an enclosure for a melting chamber shown without a seal at its inlet.

Another exemplary embodiment of an enclosure is shown in FIG. 7. The enclosure 120 has inwardly slanting walls 124 that generally form a V-shape. The perimeter of the opening 128 is configured to conform to the cross-sectional area of an ink stick fed into the chamber that includes enclosure 120. The outlet 130 is a round hole located at the bottom of the V formed by the enclosure. An outlet for a melting chamber may be configured in any one of a number of shapes; however, a round outlet is likely to be typical to accommodate tubing, which is frequently used to deliver liquid ink to a print head. The lip 134 is provided for mounting an appropriate seal to the inlet of the enclosure.

Figure 8:
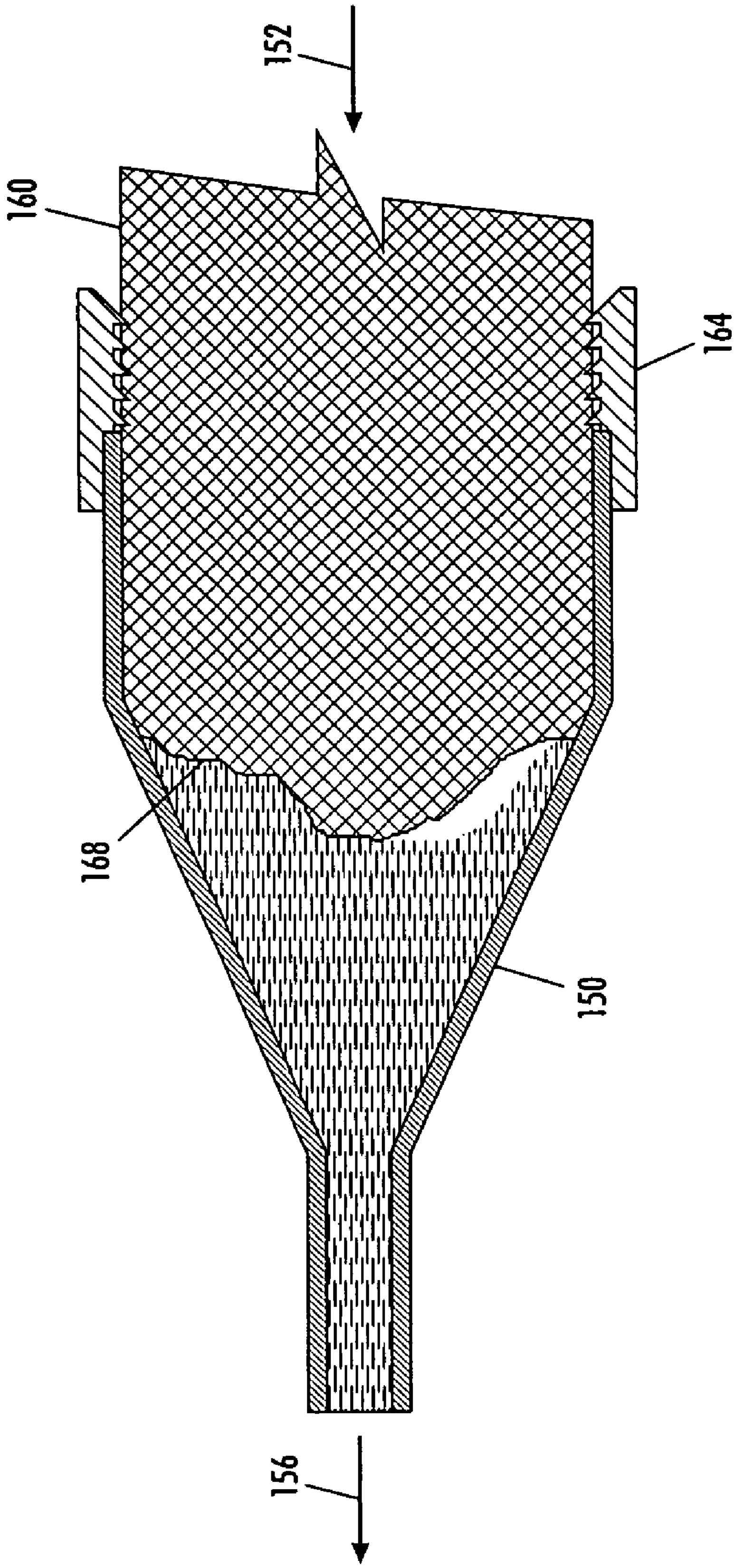
FIG. 8 is a side view of a solid ink stick melting chamber demonstrating the barrier formed by a seal at the inlet and an ink stick passing through the seal.

The barrier presented by the solid ink stick melting chamber to molten ink is described with reference to FIG. 8. The enclosure 150 has an inlet 152 and an outlet 156. An ink stick 160 is shown passing through the seal 164 mounted at the inlet 152 of the enclosure 150. As the solid ink stick travels through the seal 164 and into the heated enclosure 150, the stick is heated until it begins to melt. The transition from solid ink to melted ink occurs at the melt front 168, which is forward of the seal 164. Thus, the solid portion of the ink stick 160 from the melt front 168 back through the inlet 152, and the seal 164 form a barrier that blocks the egress of melted ink back through the inlet 152. As the ink stick is urged into the heated enclosure through the seal 164, the mass of melted ink within the enclosure increases and this increase in mass increases the pressure within the enclosure 150. As long as the seal and the solid ink stick cooperate to maintain the barrier to the melted ink, the pressure within the enclosure pushes the melted ink out through the outlet 156. Maintaining this positive pressure to push the melted ink through the outlet 156 requires that the seal 164 be able to mate sufficiently with the outer perimeter of the ink stick to prevent the ink stick from sliding out of the enclosure and that melted ink is produced at rate that maintains the pressure as melted ink egresses from the outlet 156. Although the ink stick in FIG. 8 is shown as having a regular or smooth outer perimeter, such as a circle, for example, the ink stick may have any perimeter configuration provided the seal 164 is able to mate with the perimeter to provide the barrier as described above.

A melting chamber having a heated enclosure and a seal mounted at the inlet provides a number of advantages. The barrier formed by the seal and an ink stick passing through the seal retains melted ink within the enclosure. This sealing of the heated enclosure generates pressure for improving the flow rate of the ink from the enclosure. The pressurized flow of melted ink helps ensure the ink is delivered to the print head at required flow rates without generating excess negative pressure to the print head elements as they eject ink. The pressurization provided by the seal enables the enclosure to be configured with various geometries that do not include a taper and the outlet to be placed at positions other than the lowest point of the enclosure. Moreover, the axis may be located at a position that is off the axis of the feed direction of an ink stick as it enters the melting chamber. Therefore, the melting chamber may be accommodated within different spaces of a phase change ink printer without compromising on the effectiveness or efficiency of ink supply for the print head.

Those skilled in the art will recognize that numerous modifications can be made to the specific implementations of the melting chamber described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A solid ink stick melting apparatus comprising:

an ink stick melt chamber having an enclosure with at least one heated wall, an inlet for receiving an ink stick, and an outlet for melted ink flow from the enclosure; and a plurality of seals mounted within the inlet of the enclosure, the seals being spatially separated from one another and configured to mate with an exterior surface of an ink stick having a predetermined shape, the seals forming a passageway for ink sticks within the enclosure, the seals of the passageway being positioned in the inlet to hold the exterior surface of the ink stick as a portion of the ink stick extending from the seals is melted by the at least one heated wall to enable the seals and the solid ink stick portion held by the seals to form a barrier that blocks egress of melted ink through the inlet and that generates a pressure within the enclosure that pushes melted ink through the outlet of the enclosure.

2. The melting apparatus of claim 1, the outlet being located in a wall of the enclosure at a position that is generally perpendicular to a feed direction of an ink stick to the enclosure.

3. The melting apparatus of claim 1, the enclosure being a cylinder.

4. The melting apparatus of claim 1, each seal in the plurality of seals being formed from a heat resistant, elastomeric material.

5. The melting apparatus of claim 1, each seal in the plurality of seals being formed from silicone.

6. The melting apparatus of claim 1 further comprising:

each seal having a seal reinforcing structure that biases each seal against a flow of melted ink towards the inlet.

7. The melting apparatus of claim 6, the seal reinforcing structure being an air bladder.

8. The melting apparatus of claim 6, the seal reinforcing structure being a foam layer.

9. The melting apparatus of claim 6, the seal reinforcing structure being a rib formed on a surface of the seal.

10. A phase change printer comprising:

a housing having a plurality of feed channels for receiving solid ink sticks;

a plurality of ink stick melt chambers, each ink stick melt chamber being coupled to only one of the feed channels and each ink stick melt chamber having an enclosure with at least one heated wall, an inlet for receiving an ink stick, and an outlet for melted ink flow from the enclosure;

a seal mounted within the inlet of the enclosure of each ink stick melt chamber, the seal within the inlet of each enclosure being configured to mate with an exterior surface of an ink stick having a predetermined shape, the seal forming a passageway for ink sticks within the ink stick melt chamber, the seal being positioned in the inlet to hold the exterior surface of the ink stick as a portion of the ink stick extending from the seal is melted by the at least one heated wall to enable the seal and the solid ink stick portion held by the seal to form a barrier that blocks egress of melted ink through the inlet and that generates a pressure that pushes melted ink through the outlet of the enclosure;

an ink stick push mechanism configured to transport ink sticks along the feed channels in a feed direction through the passageway formed by the seal located at the inlet of the enclosure of each ink stick melt chamber coupled to a feed channel;

a plurality of ink reservoirs, each reservoir being coupled to the outlet of only one ink stick melt chamber in the plurality of ink stick melt chambers to receive melted ink urged from the outlet of the ink stick melt chamber coupled to the ink reservoir by the pressure within the enclosure; and a print head having a plurality of piezoelectric print head elements for emitting melted ink, the print head being coupled to at least one of the reservoirs to receive melted ink from the at least one reservoir coupled to the print head.

11. The printer of claim 10, the outlet of each ink stick melt chamber being located at a position that is off axis to the feed direction into the enclosure.

12. The printer of claim 10, the enclosure of each ink stick melt chamber being configured to have a passageway with a perimeter corresponding to the perimeter of the passageway formed by the seal.

13. The printer of claim 10, the enclosure of each ink stick melt chamber being a cylinder.

14. The printer of claim 10, each seal being formed from a heat resistant, elastomeric material.

15. The printer of claim 10, each seal being formed from silicone.

16. The printer of claim 10, further comprising:

each seal having a seal reinforcing structure that biases each seal against a flow of melted ink towards the inlet.

17. The printer of claim 16, the seal reinforcing structure being an air bladder.

18. The printer of claim 16, the seal reinforcing structure being a foam layer.

19. The printer of claim 16, the seal reinforcing structure being a rib formed on a surface of the seal.

20. A method for supplying ink to a print head in a phase change printer comprising:

moving ink sticks to an inlet of an ink stick melt chamber having an enclosure with at least one wall;

heating the wall of the enclosure to melt a portion of an ink stick within the enclosure of the ink stick melt chamber;

urging an ink stick through a seal mounted proximate the inlet, the seal being configured to mate with an exterior surface of the ink stick;

holding the ink stick with the seal mounted in the inlet to enable a portion of the ink stick extending from the seal to be melted by the heated wall of the enclosure to form a barrier that blocks egress of melted ink through the inlet and that generates a pressure that pushes melted ink through an outlet of the enclosure of the ink stick melt chamber.

21. The method of claim 20 further comprising:

biasing the seal against a flow of melted ink from the inlet.

22. The method of claim 21, the seal biasing comprising:

exerting pressure against an external surface of the seal to resist the flow of melted ink from the inlet.

23. A solid ink stick melting apparatus comprising:

an ink stick melt chamber comprised of an enclosure having an opening with recesses and protuberances, an inlet for receiving an ink stick, and an outlet for melted ink to flow from the enclosure; and a seal having a plurality of lips formed from elastomeric material, the seal being mounted within the inlet adjacent to the melting chamber and the plurality of lips being configured to mate with an exterior surface of an ink stick having a predetermined shape, the lips forming a passageway having recesses and protuberances that align with the recesses and protuberances of the opening in the enclosure to enable the lips to hold the exterior surface of the ink stick as a portion of the ink stick extend from the lips is melted by a heated wall of the enclosure to enable the seal and the solid ink stick portion held by the lips of the seal to form a barrier that blocks egress of melted ink through the inlet and that generates a pressure that pushes melted ink through the outlet of the enclosure.

* * * * *